Dec. 23, 1958  W. H. PEARCE  2,865,114
SPEED RATE OF READING INDICATOR
Filed May 24, 1955

INVENTOR
Walter H. Pearce
By Herbert A. Minturn
ATTORNEY

Dec. 23, 1958 W. H. PEARCE 2,865,114
SPEED RATE OF READING INDICATOR
Filed May 24, 1955 2 Sheets-Sheet 2

INVENTOR
Walter H. Pearce
By Herbert A. Minturn
ATTORNEY

United States Patent Office 2,865,114
Patented Dec. 23, 1958

2,865,114

SPEED RATE OF READING INDICATOR

Walter H. Pearce, Indianapolis, Ind.

Application May 24, 1955, Serial No. 510,802

6 Claims. (Cl. 35—35)

This invention relates to a device intended to be used to indicate initially the ability of an individual to read and comprehend facts at his normal speed of so doing, and then to enable the individual to increase that rate of speed.

The indicator consists essentially of a device whereby a band of light of a predetermined width may be progressively carried downwardly across a page or sheet of reading matter at predetermined speed.

A primary object of the invention is to provide such a device in a very simple yet most effective combination of parts which may be produced at a relatively low cost and yet which will be extremely durable over long periods of usuage.

A further important object of the invention is to provide such a device in which the speeds of travel of the band of light across the page may be instantly varied at the will of the operator and also in which the initial starting position of the band on the page may be quickly and easily obtained.

A still further important object of the invention is to provide such a structure in a form which is exceedingly light in weight and which may be set upon a table or desk either in a home or in a class room or the like and further be in such form that all that is required to set it into operation is a single cord to a source of electric current.

The invention may be embodied in any number of forms, such for example as in a cabinet wherein there is a front opening to be had, and through which opening the reading matter may be placed upon a table, preferably inclined, with side wings to ward off rays of external light so that the only illumination to be had on the reading matter is from the source of light within the device itself. The device obviously may be employed within a booth wherein the reader is isolated from distractions which might interfere with his concentration upon the reading at hand.

These and many other objects and advantages of the invention will become apparent to those versed in the art in the following description of one particular form of the invention as illustrated in the accompanying drawings, in which.

Figure 1:
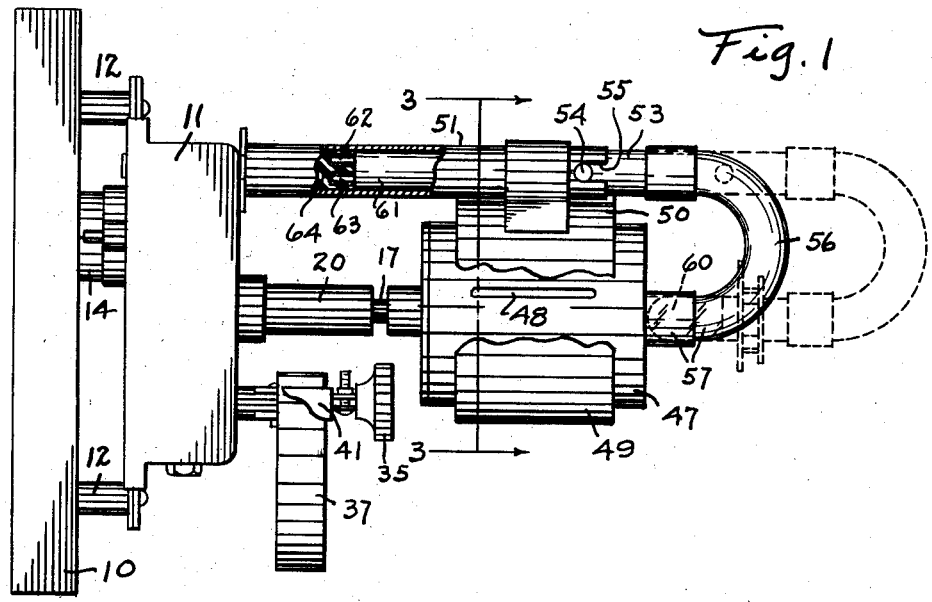
Fig. 1 is a view in top plan and partial section of a structure embodying the invention.

Any suitable supporting member such as the wall 10 may be employed, and on this member 10 is mounted a driving mechanism housing 11, herein shown in the one particular form as being set off from the wall 10 by On the relative back wall 13 of the housing 11 there means of posts 12, herein shown as four in number. is mounted an electric motor 14 of the constant speed type, such for example as a small synchronous motor. The motor 14 carries the usual gear reduction and drives a disc 15 mounted within the housing 11, Fig. 5. This constitutes the driving disc.

Figure 5:
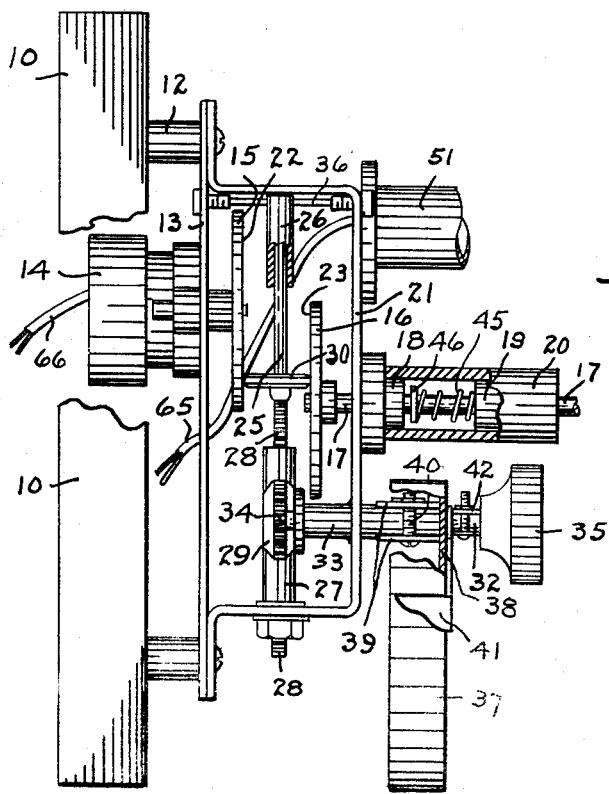
Fig. 5 is a view in top plan and partial section on an enlarged scale of the driving mechanism.

A driven disc 16 is spaced forwardly from the disc 15 and to one axial side thereof, Fig. 5, by means of being mounted on a shaft 17 which is revolubly carried by bearings 18 and 19 mounted within a sleeve 20 which is fixed to and extends forwardly from the front wall 21 of the housing 11. The two discs 15 and 16 have faces 22 and 23 respectively parallel one with the other.

A shaft 25 is mounted to extend centrally between the faces 22 and 23 by having one end portion carried within a sleeve 26 and the other end portion through a sleeve 27. The shaft 25 entering the sleeve 26 is herein shown as being cylindrical and free to slide longitudinally therein. The opposite end of the shaft 25 is formed in the nature of a gear rack bar 28 and is exposed through a gap 29 cut on the top side of the tube 27. There is fixed on the shaft 25 at the inner end of the rack bar 28 a friction disc 30 which is of a diameter to bear by its periphery normally against the faces 22 and 23. The facing of this friction disc 30 may be made out of any suitable material, cork being one material highly suitable.

The shaft 25 is preferably mounted to have its axis in the plane defined by the axes of the discs 15 and 16. A shaft 32 is revolubly carried through a sleeve 33 which is fixed to the housing side 21. This shaft 32 extends from the inner end of the tube 33 to carry a pinion gear 34 fixed thereon and in constant mesh with the rack bar 28.

A knob 35 is fixed on the outer end of the shaft 32 as a means for turning the shaft 32 and hence turning the gear 34 to cause the shaft 25 to travel longitudinally and thus correspondingly shift the friction wheel or disc 30 across the faces 22 and 23. Thus, through this friction drive, the motor 14 may drive the shaft 17 at varying speeds depending upon the position of the disc 30 across the faces 22 and 23.

In order that the friction disc 30 may bear substantially equally against the faces 22 and 23, the tube 26 is supported at its end on a rod 36 extending slidably through the sleeve 26 so that the sleeve in effect may float along that rod 36 and thus align itself freely with the axis of the shaft 25. The rack bar 28 however is slidingly carried through a cylindrical bore in the tube 27, the essential feature here being that the pinion gear 34 be maintained in constant mesh with the rack bar 28.

A speed indicating dial having a cylindrical surface 37 is fixed in position in relation to the tube 33 in turn fixed to the housing wall 21 as above indicated. In the particular form herein shown, the dial 37 is fixed to a wall 38 in turn carrying the clamp jaws 39 which compressibly engage about the tube 33 outside of the housing wall 21 by means of a screw 40. There is fixed to the shaft 32, a pointer 41 by means of the clamp 42, outside of the wall 38. The indicator finger 41 may thus be carried around over the face of the dial 37 by turning the knob 35 simultaneously with the turning of the pinion gear 34.

The shaft 17 is so mounted in the bearings 18 and 19 that it may travel longitudinally thereof. A spring 45 surrounds the shaft 17 and has one end bearing against the shaft bearing 19 and the other end against a collar 46 fixed to the shaft 17 and spaced somewhat from the bearing 18 whereby the spring 45 tends to urge the shaft 17 in that direction which will carry the face 23 of the disc 16 compressibly against the friction wheel 30. By this means the friction wheel 30 is compressibly engaged between the faces 22 and 23 so that there will be substantially no slippage between the wheel and those faces in the drive therebetween. A cylindrical shell 47 is fixed to the shaft 17 adjacent the member 20.

Figure 3:
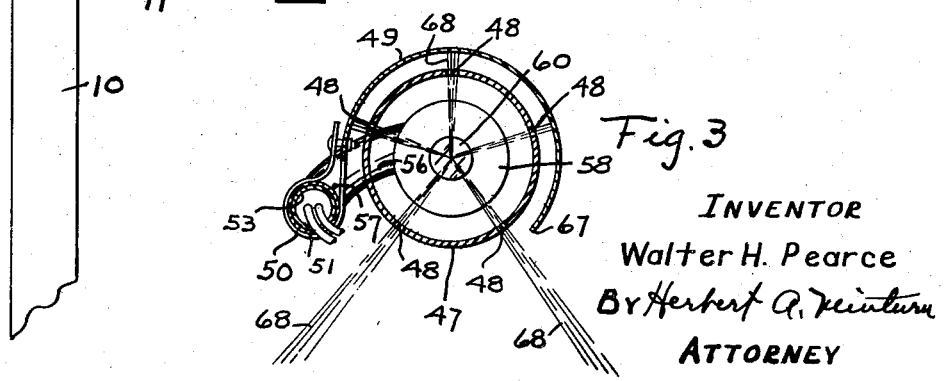
Fig. 3 is a view in transverse vertical section on the line 3—3 in Fig. 1.

This shell 47 is open at its outer end, and is provided with a plurality of slots 48 extending through the shell longitudinally thereof and at regular intervals therearound. As indicated in Fig. 3, there are five of these slots 48 equally spaced around the circumference of the shell 47. These slots 48 are parallel to the axis of the shaft 17.

Figure 4:
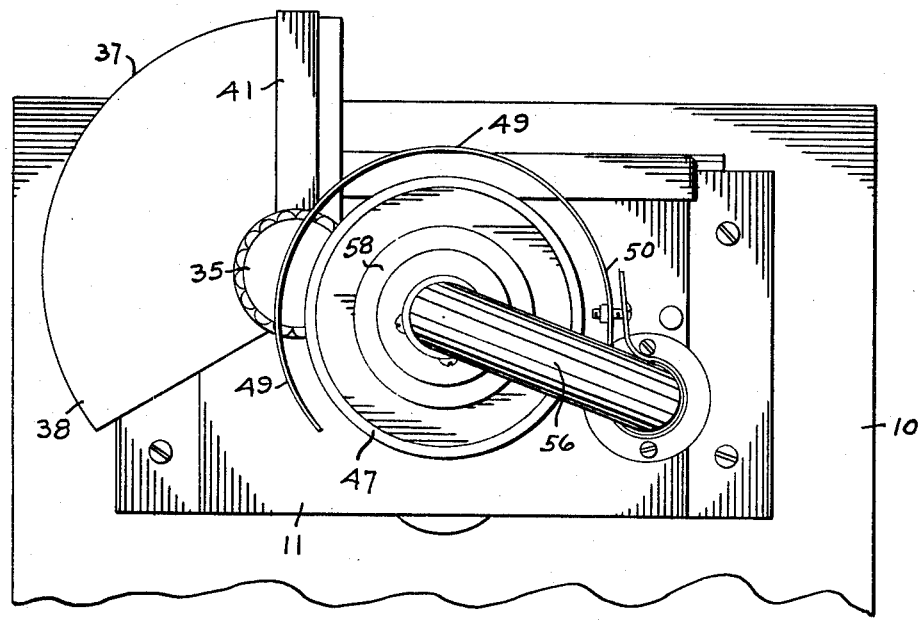
Fig. 4 is a view in end elevation of the structure.

A shade 49 is fixed by an end portion 50 by clamping engagement around a tube 51 which is fixed to the housing wall 21 and extends therefrom in parallel and spaced arrangement with and from the cylinder 47. The shade 49 is carried around the cylinder 47 in spaced relation, Fig. 3, and also Fig. 4, substantially 180 degrees, so that the slots 48 in the shell 47 are visible from the underside only as the shell is revolved. A tube 53 is telescoped by a straight length thereof within the tube 51, and is located when inserted therein for a certain length against turning by means of a pin 54 carried by the tube 53 entering a slot 55 entering from the end of the tube 51, Fig. 1. This tube 53 has an outer U-bend 56, the radius of which is such that the terminal end portion 57 of the tube is axially presented centrally of the open end of the cylindrical shell 47 to have the axis of the shaft 17 and that of the tube end portion 57 coincide.

A lamp base mounting 58 is carried by the end 57 of the tube 53 to receive an incandescent lamp 60 preferably of a tubular, prefocused type.

When the tube 53 is in the position as shown in solid lines in Fig. 1, the lamp 60 is positioned substantially centrally of the slots 48, that is the center of the filament of the lamp is thus located. In order to replace the lamp 60 in the case such an event becomes necessary, the tube 53 may be grasped by the bend 56 and pulled outwardly as indicated by dash lines in Figs. 1 and 2, where the tube is partially pulled out so that the lamp 60 will be presented externally of the shell 47 to be manipulated and fixed in the end 57.

Figure 2:
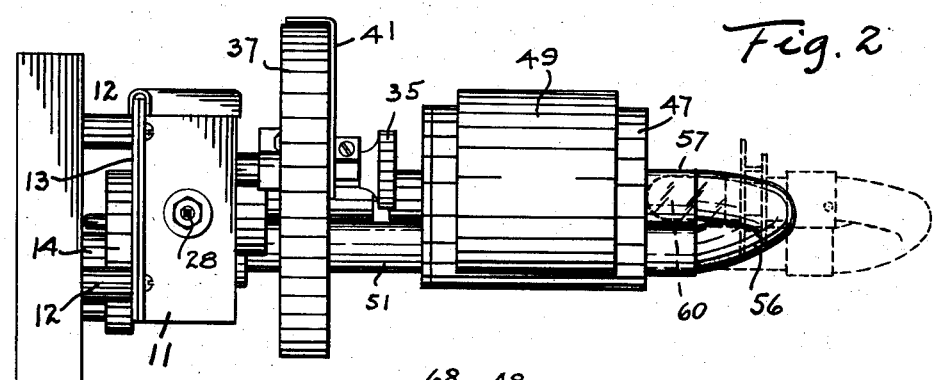
Fig. 2 is a view in front elevation of the structure.

When the tube 53 is in the positions indicated by the solid lines in Figs. 1 and 2, the inner end 61 of that tube carries the terminal prongs 62 and 63 into a receptacle 64 carried within the tube 51 to make electrical connection therebetween. The lamp 60 has an electrical connection through the tube 53 with the prongs 62 and 63, and from the receptacle 64, the cable 65, Fig. 5, leads to any suitable source of current. This lamp 60 may be operated on any desired voltage, preferably of low voltage, that is less than 110 volts, and its control may be had by any suitable rheostat and transformer means desired, such elements being well known and not shown herein. Also the motor 14 is connected to any suitable source of power through the cable 66.

The operation of the structure thus far described is as follows. The motor 14 is set into operation so as to drive the disc 15 and in turn the friction wheel 30 resulting in turning of the disc 23. The knob 35 is turned to shift the friction disc 30 between the faces 22 and 23 to give the desired speed of turning of the shell 47. Normally the friction wheel 30 will be pushed inwardly toward the center of rotation of the disc 15 to a speed indication on the dial 37 determined by observation of the normal reading rate of the individual who is being checked or tested by the device. When the shaft 17 is turning, the shell 47 likewise is turning, and light from the lamp 60 sends rays in a band 68 radially outwardly through all of the slots 48. The opening between the free edge 67 and the end 50 of the shield or shade 49 is made to be such that, in conjunction with the spacing apart of the slots 48 one from the other coupled with the speed of rotation of the shell 47, only one band of light from the lamp 60 determined by the rays coming through a slot 48 will travel from the top side to the lower side of a sheet of reading matter (not shown) which is placed under the shell 47 at some distance such for example as about 12 inches. The shell 47 is driven in a clockwise direction as viewed in Fig. 4, so that there will be a slot 48 coming from the edge 50 around the underside of the shell 47 toward the free edge 67 which causes the band of light determined by that particular slot to travel downwardly of the sheet, that is from a remote edge to a close edge in relation to the position of the individual.

The widths of the slots 48 are uniform, and are such that when the reading matter is placed under the shell 47, there will be substantially not over two or three lines of the reading matter illuminated while the rest of the reading matter will remain in substantial darkness. Normally the width of the band at the page reading level is preferred to be about three-quarters of an inch and its lateral extension will be in the neighborhood of eighteen inches although these dimensions may be varied as desired.

When the individual starts, the shell 47 may be gripped by hand and turned manually in a counterclockwise direction to allow the disc 16 to slip on the friction wheel 30 to bring one of the slots 48 in that position where a band of light will be made available at the upper end of the reading matter. Then the shell may be released to permit the motor 14 to drive it so as to carry that band of light downwardly or nearer to the operator or individual. The knob 35 is turned to cause that band of light to travel at a speed which is within the usual range of the reading by the individual of the matter illuminated progressively across the sheet. Then when that is determined, the knob 35 may be turned so as to speed up that travel of the band of light across the page to see if the individual can progressively read faster along with his comprehension of what he has read. In other words, by use of the varying rate of travel of the band of light across the sheet, the individual can be progressively brought into a higher rate of reading. The shell 47 will continue turning at a constant rate of speed in accordance with the setting of the indicator 41 around the dial 37, and it is not necessary to reset the cylinder or shell 47 thereafter unless it is desired that the band of light be shifted back up to the top of the page before it has reached the lower end for example. While it has been indicated that the shell 47 may be manually rotated counterclockwise, obviously it can be rotated clockwise as the individual may select in order to locate the band of light on the reading matter as may be desired at any time during the travel of the beam across the matter.

While I have herein shown and described my invention in the one particular form, it is quite obvious that structural changes may be made such for example as in the speed indicator, the mounting of the various elements in the drive, and in the various proportioning of the various elements, all without departing from the spirit of the invention, and I therefore do not desire to be limited to that precise form beyond the limitations which may be imposed by the following claims.

I claim:

1. A reading speed indicator for directing a band of light progressively from line to line of reading matter comprising a hollow opaque cylindrical member rotatable about its axis and having a plurality of slots through its wall spaced therearound and parallel to said axis; a source of light within said member; an opaque shield about said member open for a circumferential distance around the under side of the member; a source of power; and a variable speed transmission interconnecting said source and said member; said source turning said member at a constant rate for any speed change available through said transmission; the turning of said member producing a moving beam of light formed by passage of light from said source through said slots moving across said shield opening.

2. The structure of claim 1 in which said shield is held stationary in respect to said member, and said band is limited in width to a selected number of said lines determined by the width of said slots.

3. The structure of claim 2 in which there is a transmission change speed control, and a member speed indicator operated by said control.

4. The structure of claim 2 in which said light source comprises an electric lamp; an arm fixed in position in respect to and entering said member and carrying said lamp axially of said member.

5. In a reading time indicator, the combination of a motor; a disc driven by the motor; a shaft at substantially right angles to said disc; a cylindrical shell mounted on said shaft; a second disc mounted on said shaft; means yieldingly urging said shaft longitudinally to carry the second disc toward the first disc; a friction wheel intervening between said two discs; means for shifting the friction wheel radially of said discs; said shell having a plurality of slots therethrough circumferentially spaced therearound; an arm axially entering said shell; a lamp carried by the arm; a shield fixed in spaced relation around said shell and open across an under side allowing passage of light beams from said lamp through said slots outwardly beyond said shield; the positioning of said friction wheel across said discs determining the speed of travel of said slots across said shield opening.

6. An indicator for checking speed of reading of a fixed piece of printed matter comprising means for generating and directing a beam of light of fixed band width from top to bottom of the area in which said printed matter may be placed and for automatically repeating the passage of the beam over said area; means for varying the speed of said light directing means; and means for indicating said speed; said light beam generating and directing means comprising a cylindrical shell, means driving the shell from one end rotatably about its axis; a lamp carried by an arm entering in said shell from one end; power means for turning the shell; said shell having a plurality of slots therethrough circumferentially therearound; a fixed shield around the shell open from the shell underside; the turning of the shell carrying one slot after another across said shield opening with light from said lamp passing through the slots defining said band width moving between edges of said shield opening.

References Cited in the file of this patent

UNITED STATES PATENTS

| | | |
|---|---|---|
| 2,078,834 | Brennan | Apr. 27, 1937 |
| 2,188,210 | Smith | Jan. 23, 1940 |
| 2,266,798 | Peck | Dec. 23, 1941 |
| 2,357,593 | Leavell | Sept. 5, 1944 |
| 2,530,702 | Johnson | Nov. 21, 1950 |
| 2,535,243 | Taylor | Dec. 26, 1950 |
| 2,632,258 | Erickson | Mar. 24, 1953 |
| 2,662,307 | Simpson | Dec. 15, 1953 |
| 2,782,528 | Wastl | Feb. 26, 1957 |